Figure 4:
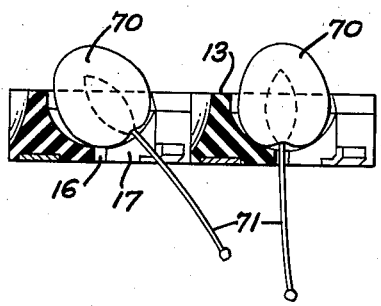

May 27, 1941. A. KOK 2,243,530
APPARATUS FOR PITTING CHERRIES
Filed June 8, 1938 2 Sheets-Sheet 1
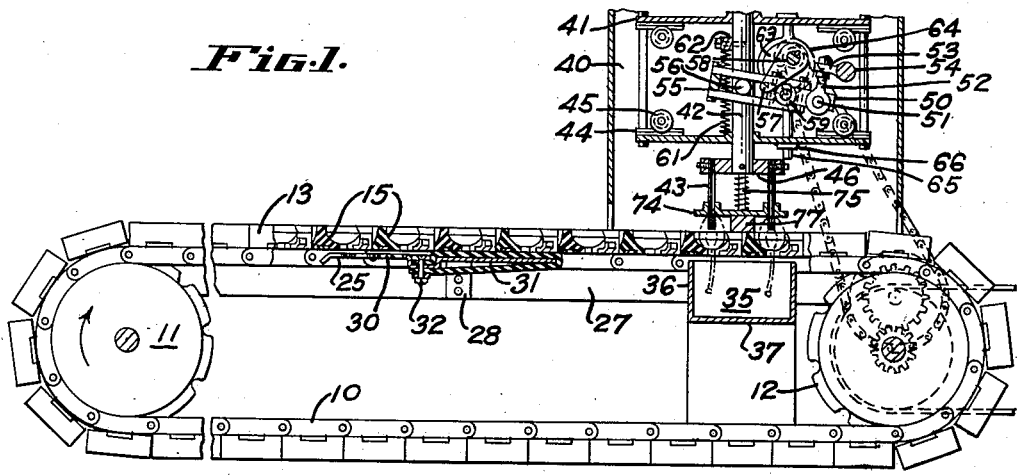
Fig.1.
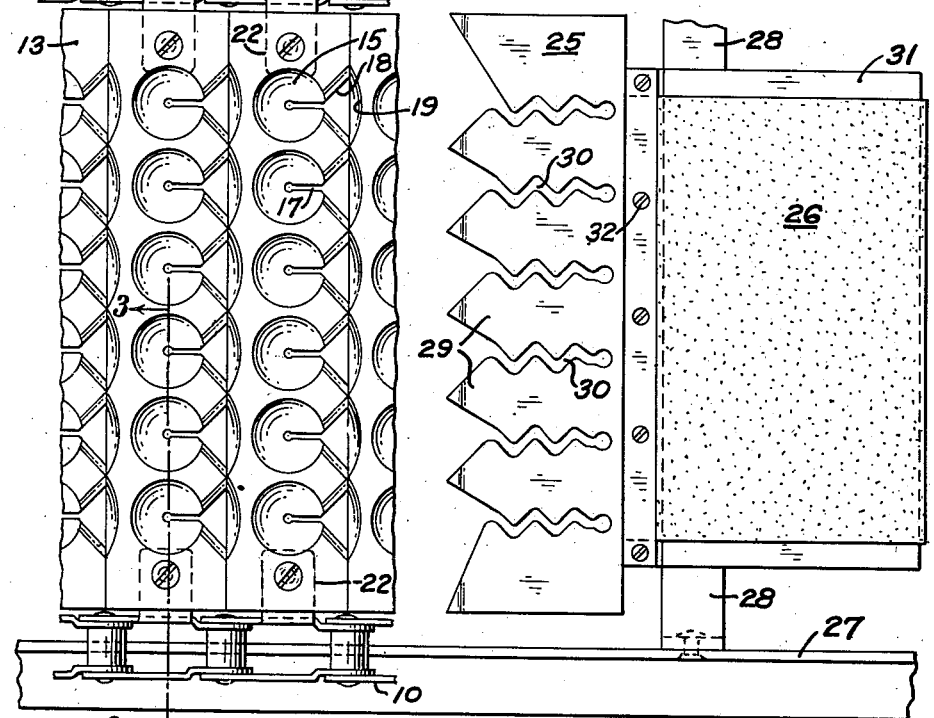
Fig.2.
Fig.3.
INVENTOR.
ALBERT KOK
BY Jas. M. Naylor
ATTORNEY.

May 27, 1941.  A. KOK  2,243,530
APPARATUS FOR PITTING CHERRIES
Filed June 8, 1938  2 Sheets-Sheet 2

INVENTOR.
ALBERT KOK
BY Jas. M. Naylor
ATTORNEY.

Patented May 27, 1941

2,243,530

UNITED STATES PATENT OFFICE 2,243,530

APPARATUS FOR PITTING CHERRIES

Albert Kok, San Jose, Calif.

Application June 8, 1938, Serial No. 212,488

16 Claims. (Cl. 146—19)

This invention relates to an apparatus of pitting and otherwise preparing cherries for packing.

The invention relates particularly to the provision of an apparatus for the simultaneous pitting and stemming of cherries, either in a fresh state or those which have been temporarily brined, in preparation for further treatment in the canning and preserving process.

The appearance of canned and preserved cherries is a factor of prime importance and as a result the fruit which has a firm, natural and unmarred appearance demands the best prices in the trade. Particularly is this so when one considers the relatively recent and marked increase in the use of cherries of all kinds not only as an item of food but as a means of garnishing various dishes and mixed drinks.

The problem of stemming and pitting cherries has been an extremely difficult one for the canners and packers of this item. True enough various mechanical devices have been devised for use in this stage of preparing the fruit for processing but in general they have been so unsatisfactory that the packers of cherries commanding the highest prices in the market have been obliged to resort virtually to a complete manual operation. This has been unsatisfactory for the obvious reason that the costs are extremely high. Moreover, it has made it impossible for a processor to handle relatively large quantities of the fruit and thus keep pace with the harvesting of this highly perishable commodity. The present invention overcomes the difficulties presented by the prior art and provides an efficient mechanism in the use of which the pitting and stemming of cherries is a speedy operation and a high degree of efficiency in plant operation is attained.

In general terms the present invention provides an apparatus whereby the pitting and stemming of the fruit is a purely automatic operation. This invention contemplates the use of a plurality of cups moving on an endless conveyor into which the individual cherries are manually placed with their stems projecting through the bottom of the cups. A comb of unusual formation is employed to engage the downwardly extending stems to manipulate the fruit in the cup toward a perfect seating thereof in readiness for the subsequent pitting operation. In addition to the comb, the invention contemplates the use of a pad of a tacky material over which the stems of the fruit are dragged as a supplementary means of manipulating the cherries within the individual cups and effecting the final seating of the same. Finally the invention contemplates the use of an apparatus which will punch the pits with the sub-joined stems from the cherries.

Other objects of the invention will become more apparent as this specification proceeds and the novelty thereof will be set forth in the appended claims.

Figure 5:
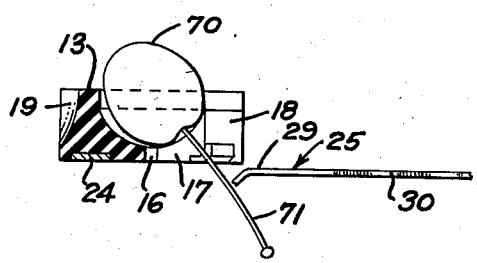
Figure 6:
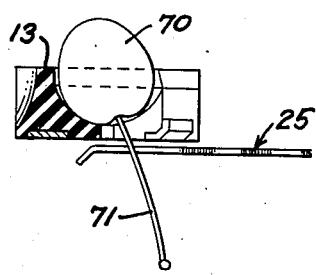
Figure 7:
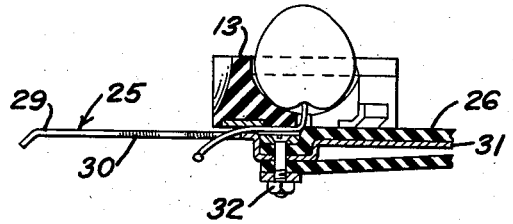
Figure 8:
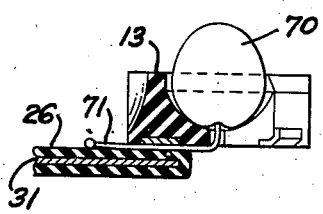
Figure 9:
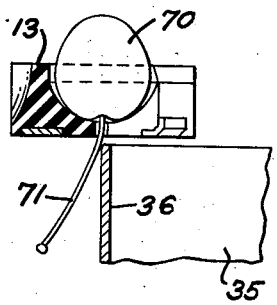
Figure 10:
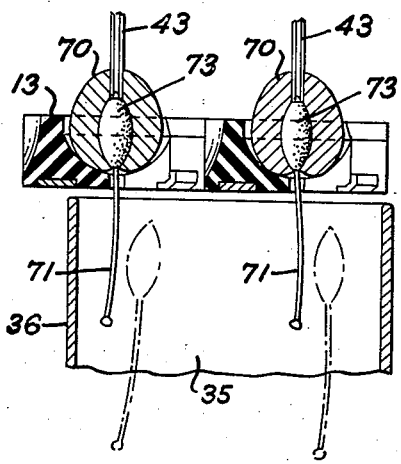

In the drawings forming a part hereof:

Figure 1 is a side elevation of the apparatus forming the subject matter of this invention, Figure 2 is a plan view of the cherry supporting and seating means, Figure 3 is a section taken along the line 3—3 of Figure 2, Figure 4 is a section of two contiguous cups with fruit in position, Figure 5 is a sectional view illustrating movement of the fruit toward the stem comb, Figure 6 is a section showing the stem of the fruit engaged by the comb, Figure 7 illustrates further movement of the fruit from the position illustrated in Figure 6, Figure 8 is a section illustrating movement of the fruit from the position indicated in Figure 7, Figure 9 is a section illustrating movement of the fruit from the position indicated in Figure 8, and Figure 10 shows the fruit in position during the pitting operation.

In the apparatus forming a part of the subject matter of this invention, I provide an endless chain 10 turning on the idler sprocket 11 and the driven sprocket 12, upon the links of which are attached a plurality of blocks 13. The blocks 13 are of rubber or any material having similar properties and each of them has a plurality of cups 15 molded into its upper surface. As will be noted from Figure 2 the cups are arranged in rows extending transversely of the chain 10. The cups 15 are each apertured at the bottom as at 16 and provided with a forwardly extending slot 17 (see Figure 2). The blocks 13 are each provided with a beveled V-shaped cut away portions 18 terminating in the slots 17 in the cups 15. As will also be noted from Figure 2 the back of each of the blocks 13 is provided with an arcuate cut-away portion 19 in registry with the V-shaped cuts 18 in the next succeeding block. As will be hereinafter more particularly pointed out the purpose of this particular arrangement is to facilitate the manual deposit of a cherry with sub-joined stem in the cup 15.

As will be noted from Figures 2 and 3, the blocks 13 are attached to the links of the chain 10 by means of lugs 22 bent at right angles to the chain to which the blocks are bolted or otherwise conventionally attached as at 23. It should be noted also that each of the blocks 13 is re-inforced by a backing plate 24 which is also beveled or cut away in the making of the V-shaped cut 18 (see Figure 5).

A comb 25 and a pad 26 are supported between the angle-irons 27 and secured thereto by means of the bracket 28, directly beneath the path of travel of the blocks 13. The comb 25 is provided with a plurality of jagged teeth 29 to define an irregular or tortuous path 30 therebetween, it being the function of the teeth to engage the stems of the cherries and by manipulation thereof seat the cherries in the cups 15, as will be hereinafter more particularly pointed out in describing the operation of the apparatus.

The pad 26, comprising a tacky material such as a sponge or partially cured rubber, is formed by drawing a sheet of such material over a plate 31 and fastening the ends thereof to the said plate by conventional means such as the nut and bolt 32 (see Figure 1).

As the cherry stems leave the teeth 29 of the comb 25 they are drawn across the tacky pad 26 which exerts sufficient pull thereon to draw the cherries into a more complete seat in the cups 15 in preparation for the subsequent pitting operation. The pull of pad 26 is insufficient to prematurely stem the fruit.

It is to be appreciated that the teeth of the comb 25 may assume shapes different from that illustrated in the drawings and that materials other than sponge or partly cured rubber may be substituted for the pad 26 without departing from the spirit of the invention. In so far as the pad 26 is concerned, it will be obvious that certain fabrics may be employed in substitution or that a brush might be substituted for both comb and pad and yet accomplish substantially the same result.

When the blocks 13 carrying the cherries have progressed beyond the pad 26 they are moved over a chute 35 likewise disposed between the frame members 27 and beneath the blocks 13. The chute 35 is comprised of a box-like structure having sides 36 and a bottom 37.

In Figure 1 of the drawings there is shown one form of punch mechanism which is suitable for use in connection with my invention. It should be noted, however, that that particular form illustrated forms no part of this invention and that other types of apparatus may be substituted without departing from the spirit of the invention.

The punch apparatus illustrated consists in a frame or housing 40 secured to the angle-irons 27 of the conveyor mechanism in any desired manner, and superposed above the chain 10 and the chute 35. A carriage 41, supporting a ram 42 and punch knives 43 is mounted for reciprocal movement within the frame 40 by means of the tracks 44 fixed on the carriage 41 and the pulley wheels 45 pinned to frame 40. The knives 43 are here shown as arranged in two parallel rows supported by a cross-head 46 pinned to the lower end of the ram 42.

The punch knives 43 are reciprocated by the following mechanism. An arm 50 is fulcrumed, as at 51, in the member 52, adjustably supported on a lug 53 projecting from bar 54 fixed in frame 40. Arm 50 has a yoke 55 engaging a roller 56 fixed on ram 42 and a cam 57, on drive shaft 58 journaled in frame 40, engages roller 59 on arm 50. Thus rotation of the cam 57 will cause ram 42 and knives 43 carried thereby to be moved downwardly in the pitting stroke. A spring 61, disposed between a bar 62, fixed on ram 42, and the bottom of carriage 41, normally urges the ram and mechanism supported thereby upwardly against the action of cam 57.

The carriage 41 is reciprocated in timed relation with the movement of the blocks 13 and chain 10 to the end that knives 43 travel with blocks 13 sufficiently to be centered over the cherries for the pitting operation. This movement of carriage 41 is accomplished by the provision of a box-cam 63 eccentrically mounted on drive shaft 58, within a housing 64. The housing 64 has upper and lower rods 65 journaled in carriage 41, as at 66. Rotation of drive shaft 57 being in a counter-clockwise direction (looking at Figure 1) it will be seen that movement of the cam 63 within its housing 64 will cause the latter to reciprocate vertically and carriage 41 to reciprocate on horizontal plane, tracks 44 moving over rollers 45. This movement of carriage 41 is approximately one and one-quarter (1¼) inches.

Rotation of drive shaft 58 is accomplished through the provision of a conventional chain and sprocket connection with the driving means for endless conveyor chain 10, there being reversal of direction of rotation as between the latter and the actuating means for ram 42 and carriage 41.

In Figures 4 to 10 of the drawings I show the progressive steps of a cherry through the apparatus hereinbefore described and a description of them will suffice as an explanation of the operation of the apparatus as a whole.

Figure 4 illustrates a successive pair of cups 15, the blocks 13 being in section, into which cherries 70 respectively, each having sub-joined stems 71, have been manually placed. In a substantial number of instances, depending upon the skill of the operators, the manual placing of the cherries 70 in the cups 15 will result in fairly good seating of the cherries in the cups, such as is indicated by the cherry in the righthand cup, looking at Figure 4. In other words, it is desired to seat the cherry 70 in the cup 15 so that the pit (shown in dotted lines) and the stem 71 are in vertical alignment with the aperture 16. The reason for this is three-fold. Firstly, proper seating of the cherry will obviate any marring of the fruit in the punching operation since the pit will be forced through the stem socket; and secondly, when properly aligned the punching of the pit through the aperture 16 will be facilitated, and thirdly, the stems will be simultaneously removed.

In other instances the manual placing of the cherry 70 in the cup 15 will result in an improper seating thereof as is plainly indicated in the lefthand portion of Figure 4.

The position of the cherry 70 in the lefthand portion of Figure 4 is repeated in Figure 5 to more clearly indicate the function of the apparatus now about to be described. As stem 71 is engaged by the jagged teeth 29 of comb 25 it is manipulated rearwardly in the V-shaped cut 18 and slot 17 toward aperture 16, a portion of which movement is indicated in Figure 6. When the block 13 has passed over comb 25 it moves directly on pad 26 (see Figure 7). In this movement stem 71 is folding under block 13 even before the tip of the stem has been withdrawn from the tortuous path 30 between teeth 29 on comb 25. The initial effect of this dragging of the stem serves to pull cherry 70 further downwardly in its seat 15 and this is fully accomplished as block 13 moves over the pad 26 of tacky material, as is indicateed in Figure 8. As a consequence of this manipulation of the fruit it will be readily seen that cherries of all sizes and shapes will be properly seated even though the cups 15 be of a uniform size and shape.

Further movement of the block 12 is toward the chute 35 and since wall 36 thereof lies in the path of stem 71 the same will be again bent rearwardly and serve to pull the cherry 70 into its proper seat, if perchance it be not already in that position as a result of movement over comb 25 and pad 26.

In Figure 10 there is illustrated a pair of cherries 70 shown in section to reveal pits 73 with sub-joined stems 71. In this view punch-knives 43 have been thrust into cherries 70 and engaged pits 73 in preparation for the pitting operation. The pitting operation is completely accomplished while the cherries 70 are over chute 35, an example of which is indicateed by the pits and sub-joined stems shown in dotted lines, and knives 43 are withdrawn from the cherries due to the urge of spring 61 on ram 46.

A stripper plate 74 affixed to the bottom of carriage 41 serves to prevent any lifting of the cherries 70 from the cups 15. The stripper plate 74 is supported from the cross-head 46 by means of a post 75 threaded into block 77 beneath plate 74. A coil spring 76 on post 75 normally urges stripper plate 74 downwardly toward blocks 13. When ram 42 moves downwardly, block 77, fixed on the bottom of plate 74 strikes blocks 13 and limits the downward movement of the stripper means. Ram 42, cross-head 46 and knives 43, however, continue their downward movement to thrust the knives through the cherries in the pitting operation.

It is believed that in the foregoing specification I have described a novel apparatus for the pitting and stemming of cherries in a highly efficient manner. As hereinbefore indicated, I do not wish to be limited to the particular apparatus shown since my invention permits of many modifications without departing from the spirit of the invention. Therefore I desire full protection of my invention according to the scope of the appended claims.

The invention claimed is:

1. In an aligning device for cherry pitting and stemming machines, the combination with a conveyor having thereon a series of apertured cherry supporting cups; of a tortuous guide extending parallel to the path of movement of said conveyor and engageable with the sides of cherry stems projecting through said apertures, for oscillating said stems and thus moving their attached fruit into alignment on predetermined axes.

2. In an aligning device for cherry pitting and stemming machines, the combination with a conveyor having thereon a series of apertured cherry supporting cups; of a member extending parallel to the path of movement of said conveyor and engageable with cherry stems projecting through said apertures for causing said stems to move in oscillations of progressively decreasing amplitude and to be finally aligned, with their attached fruit, on predetermined axes.

3. In a machine for simultaneously pitting and stemming cherries, having a conveyor provided with a series of apertured cherry supporting cups; the combination with an aligning device comprising a tortuous guide extending parallel to the path of movement of said conveyor and engageable with the sides of cherry stems projecting through said apertures for oscillating said stems and thus moving their attached fruit into alignment on predetermined axes without detaching the stems from said fruit; of punches movable along the aforesaid axes for simultaneously removing both pits and stems by punching the same through the apertures in said cups.

4. In a machine for simultaneously pitting and stemming cherries, having a conveyor provided with a series of apertured cherry supporting cups; the combination with an aligning device comprising a member extending parallel to the path of movement of said conveyor and engageable with cherry stems projecting through said apertures for causing said stems to move in oscillations of progressively decreasing amplitude and to be finally aligned, with their attached fruit, on predetermined axes; of punches movable along the aforesaid axes for simultaneously removing both pits and stems by punching the same through the apertures in said cups.

5. In a machine for simultaneously pitting and stemming cherries, having a conveyor provided with a series of apertured cherry supporting cups; the combination with an aligning device comprising means adjacent said conveyor engageable with cherry stems projecting through said apertures for moving the fruit into alignment on predetermined axes without detaching the stems from said fruit; of punches engageable with said fruit opposite the point of attachment of the stems for simultaneously removing both pits and stems by punching the same through the apertures in said cups.

6. In a cherry pitting device, endless conveyor means having a plurality of cherry supporting cups of a resilient material mounted thereon, apertures in the bottoms of said cups through which the stems of said cherries are adapted to project, stationary means for combing the stems of said cherries as they progress in the cups on said conveyor means, and means adjacent said combing means adapted to engage the stems of said cherries and pull the same more firmly into the bottoms of said cups.

7. In a cherry pitting device, endless conveyor means having a plurality of cherry supporting cups mounted thereon, apertures in the bottoms of said cups through which the stems of said cherries are adapted to project, means for combing the stems of said cherries as they progress in the cups on said conveyor means, means adjacent said combing means adapted to engage the stems of said cherries and pull the same more firmly into the bottoms of said cups, and means for punching the pits of said cherries through the apertures in the bottoms of said cups.

8. In a cherry pitting device, endless conveyor means having a plurality of cherry supporting cups mounted thereon, apertures in the bottoms of said cups through which the stems of said cherries are adapted to project, each of said cups having a slot therein extending from its periphery to the aperture in the bottom thereof, means for combing the stems of said cherries as they progress in the cups on said conveyor means, means adjacent said combing means adapted to engage the stems of said cherries and pull the same more firmly into the bottoms of said cups, and means for punching the pits of the cherries through the apertures in the bottoms of said cups.

9. In a cherry pitting device, endless conveyor means, blocks of a resilient material extending transversely on said conveyor, each of said blocks having defined therein a plurality of cherry supporting cups arranged in a row extending longitudinally of the block, apertures in the bottoms of said cups, and slots in said blocks, terminating in the apertures in the bottoms of said cups.

10. In a cherry pitting device, endless conveyor means, blocks of a resilient material extending transversely on said conveyor, each of said blocks having defined therein a plurality of cherry supporting cups arranged in a row extending longitudinally of the block, apertures in the bottoms of said cups, and slots in the front of said blocks terminating in the apertures in the bottoms of said cups, the outer ends of said slots being flared.

11. In a cherry pitting device, endless conveyor means, blocks of a resilient material extending transversely on said conveyor, each of said blocks having defined therein a plurality of cherry supporting cups arranged in a row extending longitudinally of the block, apertures in the bottoms of said cups, and slots in the front of said blocks terminating in the apertures in the bottoms of said cups, the outer ends of said slots being flared, and a plurality of cut away portions in the back of the adjacent block in registry with the flared slots in said blocks.

12. In a cherry pitting and stemming device, endless conveyer means having a plurality of cherry supporting cups of a resilient material mounted thereon, apertures in the bottoms of said cups through which the stems of said cherries are adapted to project, a comb immovably disposed to engage the cherry stems as they progress in the cups on said conveyer means, and means for punching the pits of the cherries and the connected stem through the apertures in the bottoms of said cups.

13. In a cherry pitting and stemming device, endless conveyer means having a plurality of cherry supporting cups of a resilient material mounted thereon, apertures in the bottoms of said cups through which the stems of said cherries are adapted to project, a jagged toothed comb immovably disposed to engage the cherry stems as they progress in the cups on said conveyer means, and means for punching the pits of the cherries and the connected stem through the apertures in the bottoms of said cups.

14. In a cherry pitting and stemming device, endless conveyer means having a plurality of cherry supporting cups of a resilient material mounted thereon, apertures in the bottoms of said cups through which the stems of said cherries are adapted to project, a comb disposed to engage the cherry stems as they progress in the cups on said conveyer means, a pad of tacky material positioned to engage the cherry stems as they leave the said comb, and means for punching the pits of the cherries and the connected stems through the apertures in the bottoms of said cups.

15. In a cherry pitting and stemming device, endless conveyer means having a plurality of cherry supporting cups of a resilient material mounted thereon, apertures in the bottoms of said cups through which the stems of said cherries are adapted to project, a comb disposed to engage the cherry stems as they progress in the cups on said conveyer means, a sponge rubber pad positioned to engage the cherry stems as they leave said comb, and means for punching the pits of the cherries and the connected stem through the apertures in the bottoms of said cups.

16. In a cherry pitting and stemming device, endless conveyer means having a plurality of cherry supporting cups of a resilient material mounted thereon, apertures in the bottoms of said cups through which the stems of said cherries are adapted to project, a jagged toothed comb disposed to engage the cherry stems as they progress in the cups on said conveyer means, a sponge rubber pad positioned to engage the cherry stems as they leave said comb, and means for punching the pits of the cherries and the connected stem through the apertures in the bottoms of said cups.

ALBERT KOK.